Dec. 22, 1953  F. ROMANO  2,663,087
MICROMETER GAUGE
Filed Nov. 14, 1950  2 Sheets-Sheet 1
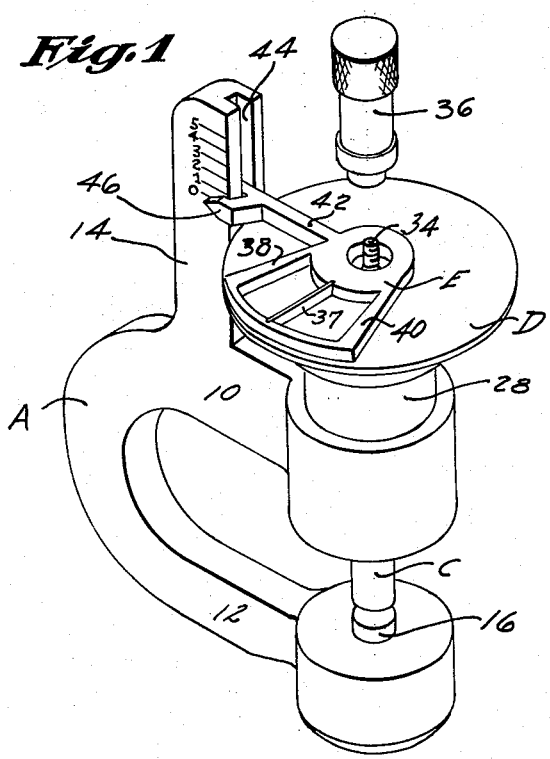
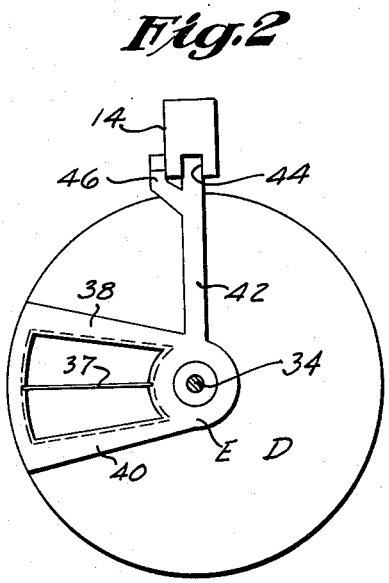
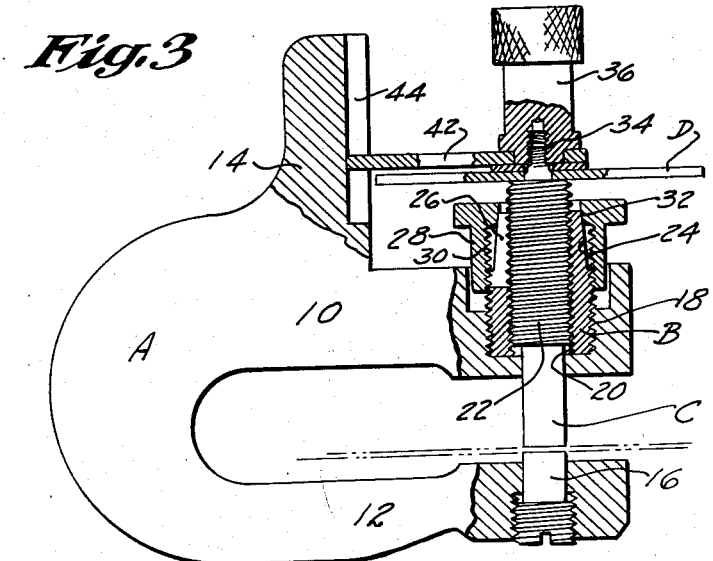
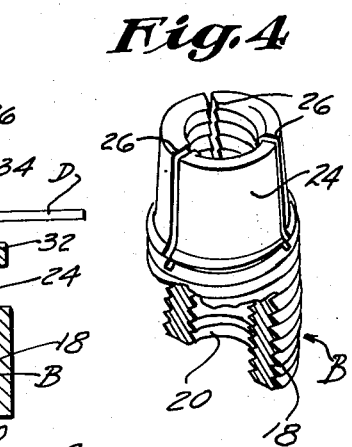
INVENTOR.
Francesco Romano
BY Harry Langsam
Attorney Dec. 22, 1953    F. ROMANO    2,663,087
MICROMETER GAUGE
Filed Nov. 14, 1950    2 Sheets-Sheet 2

INVENTOR.
Francesco Romano
BY
Harry Langsam
Attorney

Patented Dec. 22, 1953

2,663,087

UNITED STATES PATENT OFFICE 2,663,087

MICROMETER GAUGE

Francesco Romano, New York, N. Y.

Application November 14, 1950, Serial No. 195,594

1 Claim. (Cl. 33—166)

My invention relates to a micrometer and relates particularly to a micrometer whereby the decimal thickness of the article measured can be determined as well as the gauge of the metal.

Heretofore, micrometers have been used to determine the thickness of metals. However, the prior art micrometers never have given the gauge and decimal tolerances of the metals.

It, therefore, is an object of my invention to provide a micrometer gauge which shows the maximum and minimum limits of thickness or tolerances of the metal.

Another object of my invention is to provide a micrometer caliper wherein either the decimal thickness or the gauge number itself can be read.

Another object of my invention is to provide a micrometer caliper wherein the upper and lower tolerances of metal can be obtained.

Another object of my invention is to provide a micrometer gauge whereby an unskilled person may determine the gauge accurately and rapidly.

Other objects of my invention are to provide an improved device of the character described, that is easily and economically produced, which is sturdy in construction, and which is highly efficient in operation.

With the above and related objects in view, my invention consists in the details of construction and combination of parts, as will be more fully understood from the following description when read in conjunction with the accompanying drawing, in which:

Fig. 1 is a perspective view of a micrometer caliper embodying my invention.

Fig. 2 is a top view of Fig. 1 with the turning knob removed.

Fig. 3 is a fragmentary side elevational view of the micrometer, shown in Fig. 1.

Fig. 4 is a perspective view of the internally and externally threaded bushing.

Figure 5:
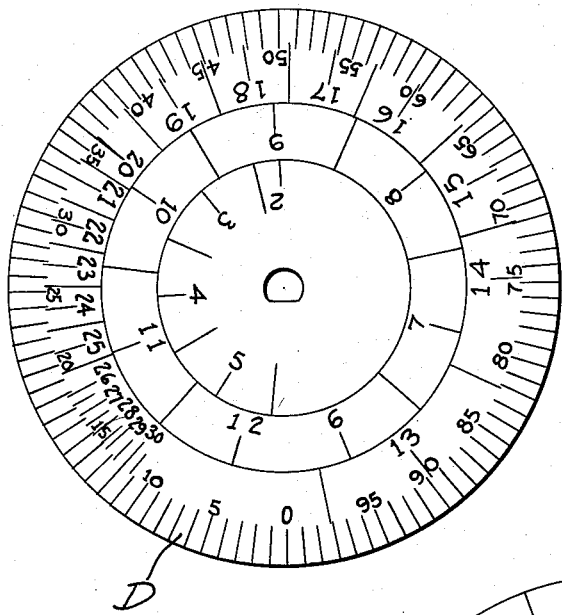
Fig. 5 is a plan view of a plate which indicates both decimal limits as well as gauge numbers.
Figure 6:
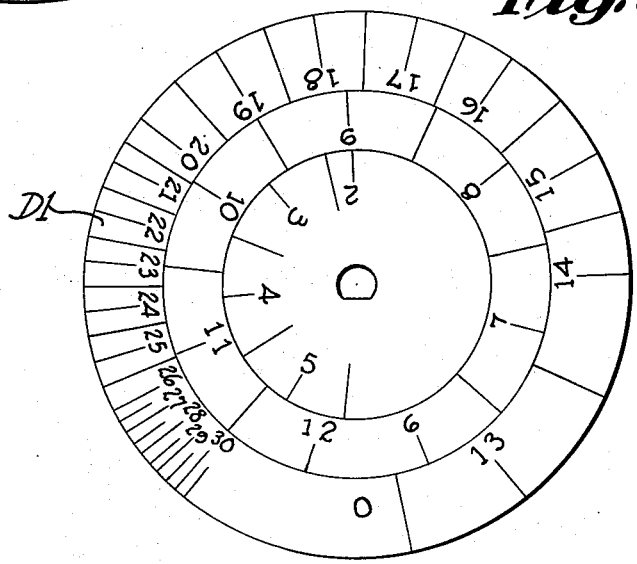
Fig. 6 is a plan view of another type of plate wherein only the gauge is indicated.

Referring now in detail to the drawings wherein similar reference characters refer to similar parts, I show a pair of micrometer calipers having an integralley formed C-shaped frame, generally designated as A, which has two legs 10, 12 and a vertically-extending leg 14. The leg 10 has an opening thereon to receive a bushing, generally designated as B, which is threaded externally at 18 and internally at 20.

The external threads 20 are threaded into the tapped opening on the leg 10 and the internal threads 20 are engaged by the threads 22 on the movable micrometer shaft, generally designated as C.

The bushing B has a tapered upper end 24 wherein there are a plurality of slits 26. The slits permit the upper portion or the tapered part of the bushing B to be compressed or expanded as the case may be.

A holding nut 28 is internally threaded as at 30 to engage the external threads on the bushing B. However, the upper surface of the nut 28 has a tapered surface 32 so that the taper surface 32 may engage the tapered surface 24 of the bushing in order to compress the internal threads against the threads 22. When the nut 28 is tightened on the bushing B the tapered end of the bushing is compressed about the shaft or jaw C.

An extension 34 on the shaft C is adapted to be engaged by a turning knob 36 which provides the turning moment for the shaft C.

The index, generally designated as E, carries a central index pointer 37 and two side indexes 38 and 40 wherein the upper tolerance and the lower tolerance of the gauge may be determined. The index E encircles the extension 34 of jaw or shaft C and it has a member 42 which vertically rides in a recess or track 44 of the leg 14. An index or pointer 46 on the outside of the member 42 is adapted to point to indicia on leg 14.

My invention operates as follows:

Assuming the proper scale is used the knob 36 is turned so that the article, such as a plate or wire is positioned between the jaws 16, C of the micrometer. The pointer 46 may generally point to the indicia marked on the extension 14. The index pointer 37 projected upon the scale D gives the numerical decimal or gauge and the indexes 38, 40 give the extreme tolerances. For example, if the nominal thickness is .050, the user merely turns the index pointer 37 to .050 and reads the tolerance limits .048 and .052 at the side indexes 38 and 40. Hence, he knows the limits without resorting to a book which gives the tolerances.

Although my invention has been described in considerable detail, such description is intended as being illustrative rather than limiting, since the invention may be variously embodied, and the scope of the invention is to be determined as claimed.

I claim as my invention:

A micrometer having a fixed jaw and a complementary movable jaw to measure the thickness or gauge of material, a rotatable plate having indicia thereon to indicate decimals and gauges and said plate being movable with said movable jaw, a single index member having a central index pointer and two side indexes whereby the upper and lower tolerance limits may be determined, said index member overlying said indicia on said plate, a second pointer integrally connected to said single index member, a spaced guide member integrally connected to said second pointer, a track for guiding said second pointer, and indicia to which said second pointer is directed whereby the number of turns of said rotatable plate is indicated.

FRANCESCO ROMANO.

References Cited in the file of this patent

UNITED STATES PATENTS

| Number | Name | Date |
|---|---|---|
| 346,705 | Barnes | Aug. 3, 1886 |
| 396,479 | Green | Jan. 22, 1889 |
| 554,524 | Mings | Feb. 11, 1896 |
| 676,637 | Spalding | June 18, 1901 |
| 1,341,546 | Davis | May 25, 1920 |
| 2,484,772 | Worthen | Oct. 11, 1949 |

FOREIGN PATENTS

| Number | Country | Date |
|---|---|---|
| 135,051 | Great Britain | Nov. 20, 1919 |